United States Patent
Chhaya et al.

(10) Patent No.: US 10,389,679 B2
(45) Date of Patent: Aug. 20, 2019

(54) LEVELS OF COMPETENCY IN AN ONLINE COMMUNITY

(71) Applicant: Adobe Inc., San Jose, CA (US)

(72) Inventors: Niyati Chhaya, Pune (IN); Laurie M. Byrum, Pleasanton, CA (US); Harsh Jhamtani, Kanpur (IN); Calvin K. C. Wong, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/152,107

(22) Filed: Oct. 4, 2018

(65) Prior Publication Data
US 2019/0036867 A1 Jan. 31, 2019

Related U.S. Application Data

(63) Continuation of application No. 15/074,956, filed on Mar. 18, 2016, now Pat. No. 10,135,779.

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/16* (2013.01); *H04L 67/104* (2013.01); *H04L 67/22* (2013.01); *H04L 67/306* (2013.01)

(58) Field of Classification Search
CPC ....... H04L 51/32; H04L 51/16; H04L 67/105; H04L 67/22; H04L 67/306
See application file for complete search history.

(56) References Cited

U.S. PATENT DOCUMENTS

| 6,131,673 A | * | 10/2000 | Goldman | E21B 12/02 175/39 |
| 8,755,872 B1 | * | 6/2014 | Marinow | A61B 5/024 600/509 |
| 10,135,779 B2 | | 11/2018 | Chhaya et al. | |
| 2003/0003605 A1 | * | 1/2003 | Chen | B24B 37/013 438/8 |

(Continued)

OTHER PUBLICATIONS

"Non-Final Office Action", U.S. Appl. No. 15/074,956, dated Apr. 6, 2018, 10 pages.

(Continued)

*Primary Examiner* — Thanh T Nguyen
(74) *Attorney, Agent, or Firm* — SBMC

(57) ABSTRACT

Techniques and systems are described to determine levels of competency of users as part of an online community and control generation of subsequent digital content to be used interaction of the online community with the users based on this determination. In one example, determination of the level of competency is based on relevance to topics of the online community. In another example, a determination is made as to whether the topic of the online community is stable before using user competency scores to control generation of subsequent digital content. In a further example, users of the online community are identified as exhibiting dormant or non-dormant behavior and used as a basis to control generation of subsequent digital content. In yet another example, user competency scores are adjusted based on a decay factor to address dormancy of users over a period of time.

20 Claims, 15 Drawing Sheets

(56) References Cited

U.S. PATENT DOCUMENTS

| | | | | |
|---|---|---|---|---|
| 2003/0093235 A1* | 5/2003 | Dorfman | ............... | G06F 17/17 |
| | | | | 702/85 |
| 2007/0129892 A1* | 6/2007 | Smartt | ............... | G01C 21/32 |
| | | | | 702/5 |
| 2010/0259415 A1* | 10/2010 | Strachan | ............... | E21B 44/00 |
| | | | | 340/853.6 |
| 2011/0112442 A1* | 5/2011 | Meger | ............... | A61B 5/0002 |
| | | | | 600/595 |
| 2011/0174541 A1* | 7/2011 | Strachan | ............... | E21B 44/00 |
| | | | | 175/27 |
| 2015/0206169 A1 | 7/2015 | Ye et al. | | |
| 2017/0236424 A1 | 8/2017 | Poisson et al. | | |
| 2017/0236434 A1 | 8/2017 | Mehta | | |
| 2017/0272396 A1 | 9/2017 | Chhaya et al. | | |

OTHER PUBLICATIONS

"Notice of Allowance", U.S. Appl. No. 15/074,956, dated Aug. 16, 2018, 8 pages.

* cited by examiner

LEVELS OF COMPETENCY IN AN ONLINE COMMUNITY

RELATED APPLICATION

This application is a continuation of and claims priority to U.S. patent application Ser. No. 15/074,956, filed Mar. 18, 2016, entitled "Levels of Competency in an Online Community," the entire disclosure of which is hereby incorporated by reference herein.

BACKGROUND

Online communities are configured to support user interaction to share information about a particular topic. For example, users may post digital content such as comments, images, and so forth to share with other users of the online community. In some instances, online communities may have hundreds, thousands, and even hundreds of thousands of users.

A majority of online communities include a large number of dormant users that exhibit minimal participation as part of the community. In order encourage users to participate as part of the online community, techniques have been developed to indicate a level of competence of respective users as part of the interaction with the online community. An example of this is the use of badges that indicate respective competence (e.g., expertise), of the users in relation to the topic, e.g., an expert badge identifies users who have expertise in geology in an online community dedicated to the topic of geology. The badges of often considered a reward to the users that participate as part of the online community and thus encourage this participation. The use of badges can also provide the online community with an indication as to how much weight to give particular users for their posts in relation to the topic.

Conventional techniques used to determine and assign levels of competency (e.g., expertise), however, are often inefficient and inaccurate. In one such example, conventional techniques rely solely on participation, and not on whether that participation is related to the topic. Accordingly, users casually conversing with others in the online community about a topic may be assigned a badge indicating those users are experts, regardless of whether these casual conversations actually relate to the topic.

In another such example, users are wrongfully assigned levels of competency (e.g., are indicated as experts) in the initial stages of an online community. This is commonly referred to as a "cold start" problem due to insufficient amounts of data that are available to make the determination as to which users are to be identified as experts. Accordingly, these wrongfully assigned levels of competency may defeat the actual purpose of use of these levels as part of interaction with the online community, e.g., by wrongly indicating experts in the community.

In further such example, reliance on participation of the users to determine levels of competency does not address when this participation occurred. For example, a first user may have exhibited significant amount of participation in the past, whereas a second user may have exhibited that same amount of participation in a more recent timeframe. Conventional techniques to determine the level of competency of both users, however, assign the same level of competency to both the first and second users regardless of when this participation occurred, and thus this level of competency may also lack accuracy.

SUMMARY

Techniques and systems are described to determine levels of competency of users as part of an online community and control generation of subsequent digital content to be used interaction of the online community with the users based on this determination. In one example, determination of the level of competency is based on relevance to topics of the online community. In another example, a determination is made as to whether the topic of the online community is stable before using user competency scores to generate subsequent digital content, e.g., badges, recommendations, and so on. In a further example, users of the online community are identified as exhibiting dormant or non-dormant behavior, and used as a basis to control generation of subsequent digital content for use as part of interaction with the online community.

In yet another example, user competency scores are adjusted based on a decay factor to address dormancy of users over a period of time. This may be performed solely for users that have been identified as dormant (e.g., based on a threshold) or for any of the users for which a user competency score is to be determined. The decay factor may also be computed in a variety of ways, such as user specific or community generic.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
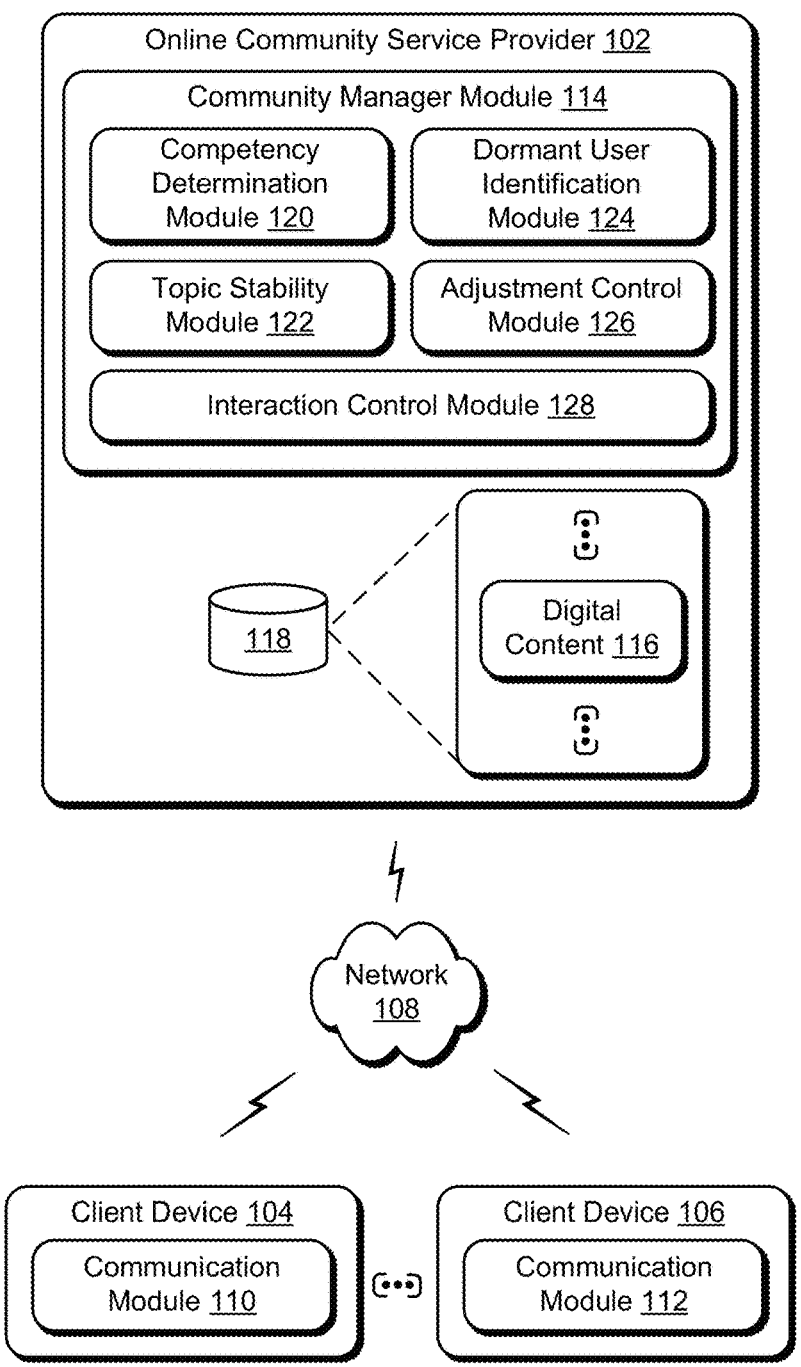
FIG. 1 is an illustration of an environment in an example implementation that is operable to employ level of competency techniques described herein.

Levels of competency of users in relation to a topic of an online community may be leveraged to support a variety of functionality. For example, the levels of expertise can be used to generate different badges to help users readily determine which other users are considered "experts" or "novices" in relation to the topic. In another example, the levels of competency can be used to suggest digital content to the users, e.g., detailed digital content to experts and generalized digital content to non-experts. Conventional techniques that rely solely on participation lack accuracy, however, lack accuracy in the determining correct levels of competency and thus also lack accuracy in use of these levels in conjunction with this functionality.

Techniques and systems are described that are usable to determine levels of competency of users as part of an online community and control generation of subsequent digital content to be used as part of interaction of the online community with the user based on this determination. The subsequent digital content may take a variety of forms for use as part of this interaction, such as an indication (e.g., a badge) of the level of competency, a recommendation of other digital content, a recommendation for inclusion as part of a group, and so forth. In one example, determination of the level of competency is based on relevance of posted digital content to topics of the online community. In this way, users, who post content that is relevant to the online community, are assigned user higher competency scores than those users who do not. That is, these higher competency scores indicate higher levels of competency in relation to the topic. Additionally, this determination may also be based on a level of participation of the community and even the users themselves. This may be used to differentiate between users that provide answers with accurate relevant digital content and engage a number of other users as part of the online community, as opposed to users who simply comment (e.g., "that's great") or users who engage a few number of other users as part of the community.

For instance, in an online community that has a topic of "baseball," a user that posts frequently about topics that do not pertain to the online community may be given a lower user competency score than another user that makes fewer posts, but those posts pertain to the topic. Further discussion of these and other examples is included in relation to FIGS. 2-5 in the following.

In another example, a determination is made as to whether the topic of the online community is stable before using user competency scores to control interaction of the online community. Stability includes whether a topic of the online community is stable through examination of digital content posted as part of the community, i.e., determining that the digital content pertains to the topic. In this way, the determination of stability and of the topic helps to ensure that the determined levels of competency pertain to a correct topic of the online community. Such techniques can advantageously address changing topics associated with the online community and thus how levels of competency are determined in relation to those changing topics. Furthermore, the determination of stability can help to protect against the "cold start" problem, in which an insufficient amount of digital content associated with an online community causes erroneous determination of levels of competency for the uses. Further discussion of determining stability of the online community is included in relation to FIGS. 6-7 in the following.

In a further example, users of the online community are identified as exhibiting dormant or non-dormant behavior, e.g., whether the users exhibit a threshold level of participation with the online community. This identification may be based through comparison of levels of competency of the users (e.g., through use of user competency scores) to a threshold. Users that have levels of competency that are below the threshold are considered dormant. This identification of dormant users may be used to support a variety of functionality. In one example, user competency scores of dormant users are ignored as part of identification of "experts" in the online community to avoid a bias caused by the dormant users. The bias, for instance, may cause a lowering of a mean user competency score for the online community and thus a determination of which users are to be considered experts based on this score. Further discussion of determination of dormant users of the online community is included in relation to FIGS. 8-10 in the following.

In yet another example, user competency scores are adjusted based on a decay factor to address dormancy of users over a period of time. The decay factor is used to reduce an influence of participation as part of the online community based on an amount of time that has passed since that participation occurred. In this example, the decay factor is used to reduce an influence of digital content over time on determination of the user competency score. This may be performed solely for users that have been identified as inactive (e.g., based on a threshold) or for any of the users for which a user competency score is to be determined. The decay factor may also be computed in a variety of ways, such as user specific as described in relation to FIGS. 11-12 or community generic as described in relation to FIGS. 13-14.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ online community control techniques described herein. The illustrated environment 100 includes an online community service provider 102 and a plurality of client devices 104, 106 that are communicatively coupled via a network 108. Computing devices that implement the online community service provider 102 and the client devices 104, 106 may be configured in a variety of ways.

A computing device, for instance, may be configured as a desktop computer, a laptop computer, a mobile device (e.g., assuming a handheld configuration), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 15.

The client devices 104, 106 are illustrated as including respective communication modules 110, 112. The communication modules 110, 112 are implemented at least partially in hardware to interact with an online community managed by a community manager module 114 of the online community service provider 102 via the network 108. The communication modules 110, 112, for instance, may be implemented as network-enabled applications, browsers, third-party plug-in modules, and so forth.

An online community is a virtual community that is accessible via the network 108 to permit users of the client devices 104, 106 to interact regarding a particular topic. Accordingly, the online community may act as an information system where users that are members of the community can interact using digital content 116 to originate posts, comment on discussion, give advice, or collaborate regarding the topic.

Accordingly, digital content 116 may be shared as part of interaction with the online community managed by the one community service provider 102, which is illustrated as stored in storage 118 of the online community service provider 102. Other examples are also contemplated, e.g., such as to distribute storage of the digital content 116 across the client devices 104, 106. Examples of digital content 116 shared as part of the online community includes text, articles, images, media (e.g., video), audio data, and so forth. A user of client device 104, for instance, may post text to the online community that is then obtained by client device 106 from the online community service provider 102 in a centralized communication example. Non-centralized examples are also contemplated, such as peer-to-peer communication.

The community manager module 114 may incorporate a variety of functionality as part of management of the online community. A first example of this functionality is illustrated as a competency determination module 120 implemented at least partially in hardware to determine a user competency score defining a level of competency of a user of the online community in relation to the topic. The competency determination module 120, for instance, may determine the user competency score based on an amount of relevancy of digital content originated by a user in relation to the topic of the online community and an amount of participation (e.g., engagement) exhibited by the user as part of the online community. In this way, the user competency score accurately describes the user's level of competency in relation to the topic, and not just number of interactions as determined by conventional techniques. Further discussion of determination of the user competency score is included in relation to FIGS. 2-5 in the following.

A second example of this functionality is illustrated as a topic stability module 122. The topic stability module 122 is implemented at least partially in hardware to determine whether the topic of the online community is stable. If stable, the competency determination module 120 is then employed to determine the user competency scores 120 and thus may address changing topics of the online community, e.g., from baseball to restaurants. The determination of stability by the topic stability module 122 helps also helps to protect against a "cold start" problem in which an insufficient amount of digital content 116 associated with an online community causes erroneous determination of user competency scores. Further discussion of determination of stability of the online community is included in relation to FIGS. 6-7 in the following.

A third example of this functionality is illustrated as a dormant user identification module 124. This module is implemented at least partially in hardware to identify which users of the online community exhibit dormant or non-dormant behavior. Identification of dormant and non-dormant users may be based through comparison of user competency scores to a threshold. Digital content of dormant users is then ignored to avoid an offset caused by the dormant users in addressing the non-dormant users, e.g., to accurately assign badges. Further discussion of determination of stability of the online community is included in relation to FIGS. 8-10 in the following.

A fourth example of this functionality is illustrated as an adjustment control module 126. The adjustment control module 126 is implemented at least partially in functionality to adjust user competency scores based on a decay factor. The decay factor is another technique that is usable in this case to address dormancy of users over a period of time. In this example, the decay factor is used to reduce an influence of digital content over time on determination of the user competency score. This may be performed solely for users that have been identified as inactive (e.g., based on a threshold) or for any of the users for which a user competency score is to be calculated. The decay factor may also be computed in a variety of ways, such as user specific as descried in relation to FIGS. 11-12 or community generic as described in relation to FIGS. 13-14.

The interaction control module 128 is implemented at least partially in hardware to control generation of subsequent digital content for use as part of interaction of the online community with the user based on the user competency scores. Examples of this subsequent digital content include an indication of the user competency score that is displayable as part of the user's interaction with the online community, e.g., a badge. In another example, a ranking is assigned to the user that is displayable as part of the online community, e.g., as part of a "top experts" list. In a further example, a recommendation is formed for a grouping that includes the user with other like users based on the user competency scores formed as part of the online community, e.g., to form "expert" and "novice" sub-communities. In yet another example, the user competency scores are used as a basis to recommend other digital content to the user, e.g., to recommend detailed technical manuals to "expert" users and tutorials to "novice" users. Additional examples are included in the following sections.

User Competency Level Determination

Figure 2:
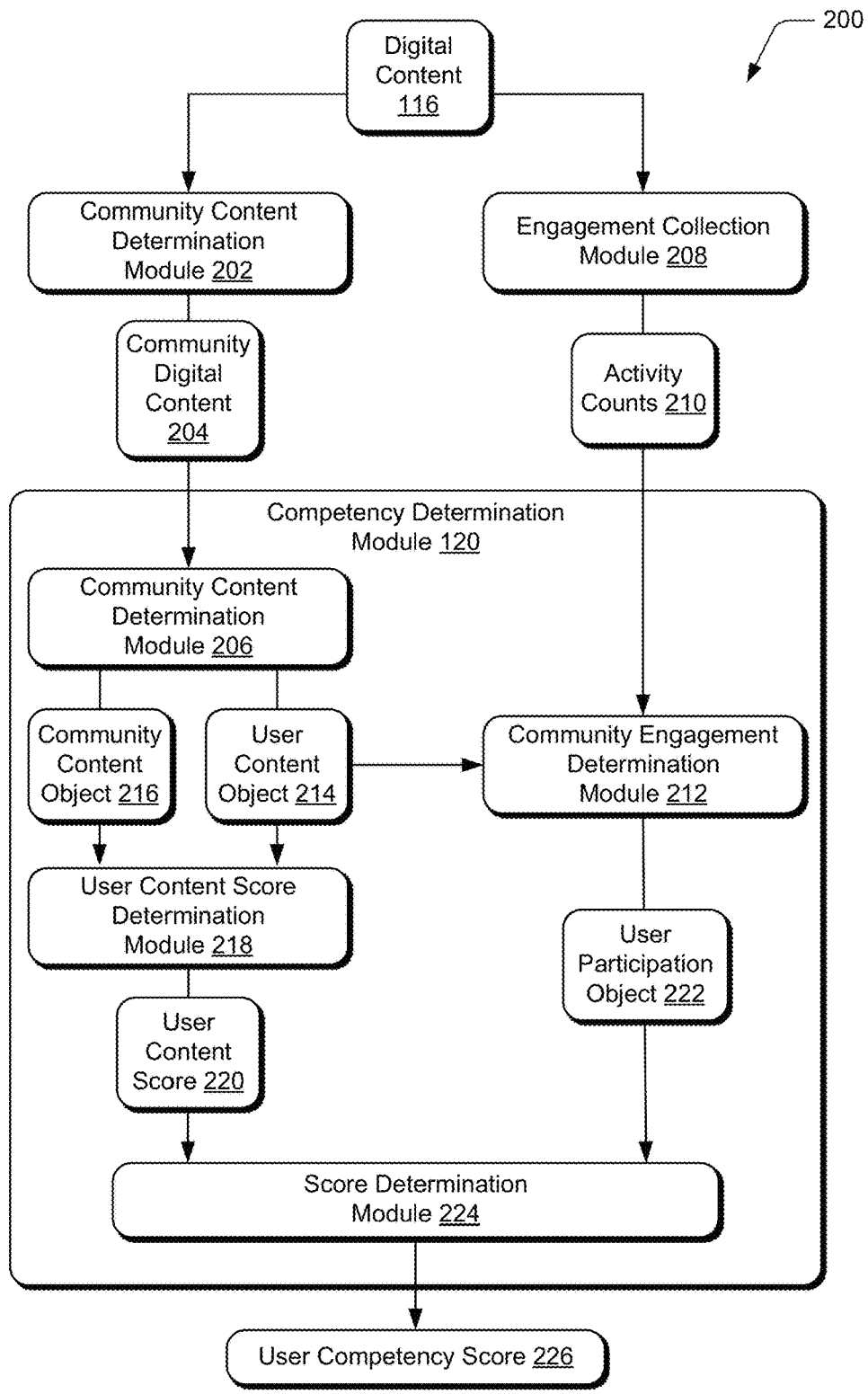
FIG. 2 depicts a system in an example implementation showing operation of a competency determination module of FIG. 1 in greater detail.
Figure 3:
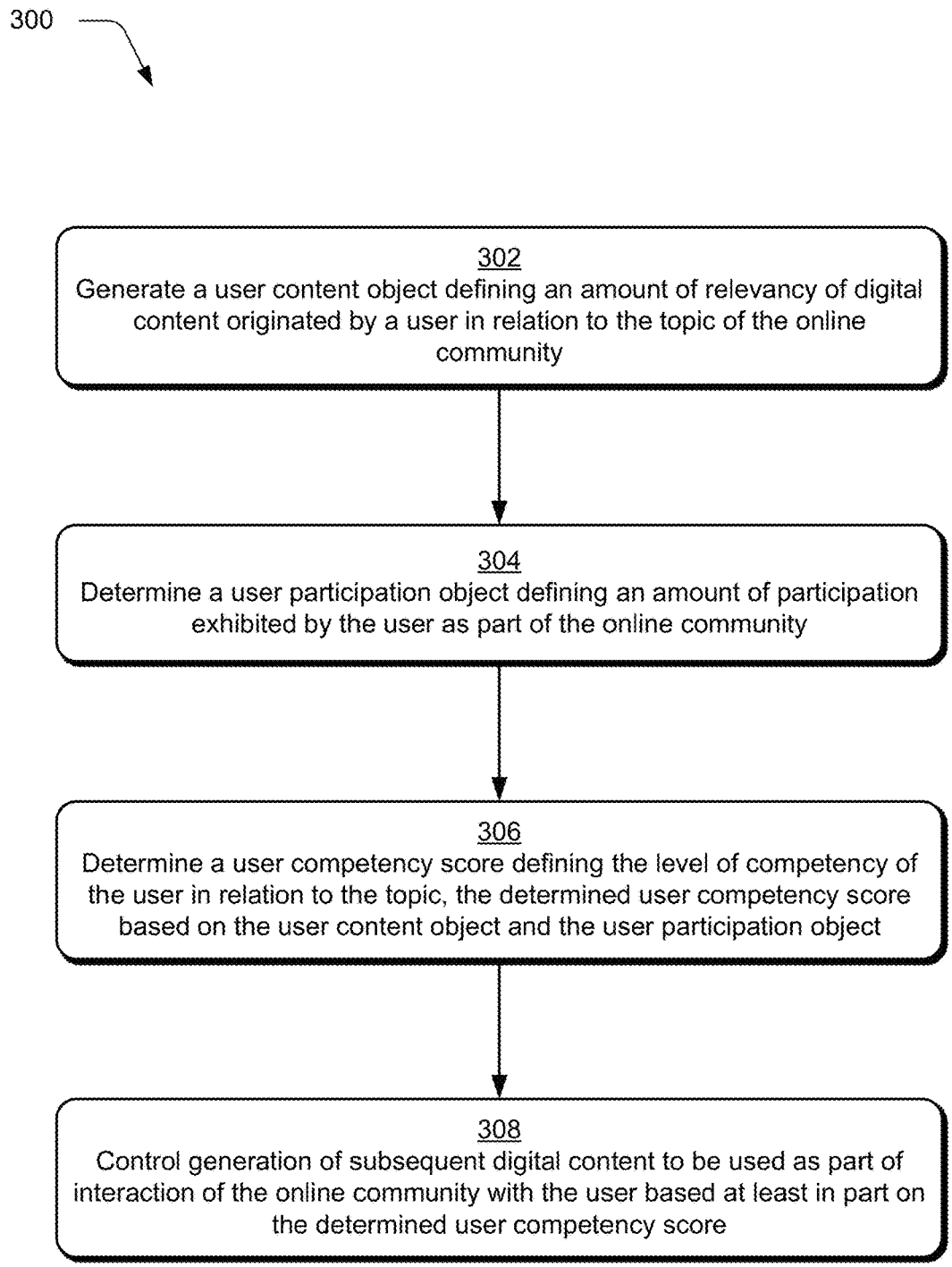
FIG. 3 is a flow diagram depicting a procedure in an example implementation in which a user competency score is determined based on an amount of participation exhibited by a user as part of an online community and relevancy of the digital content to a topic of the online community.
Figure 4:
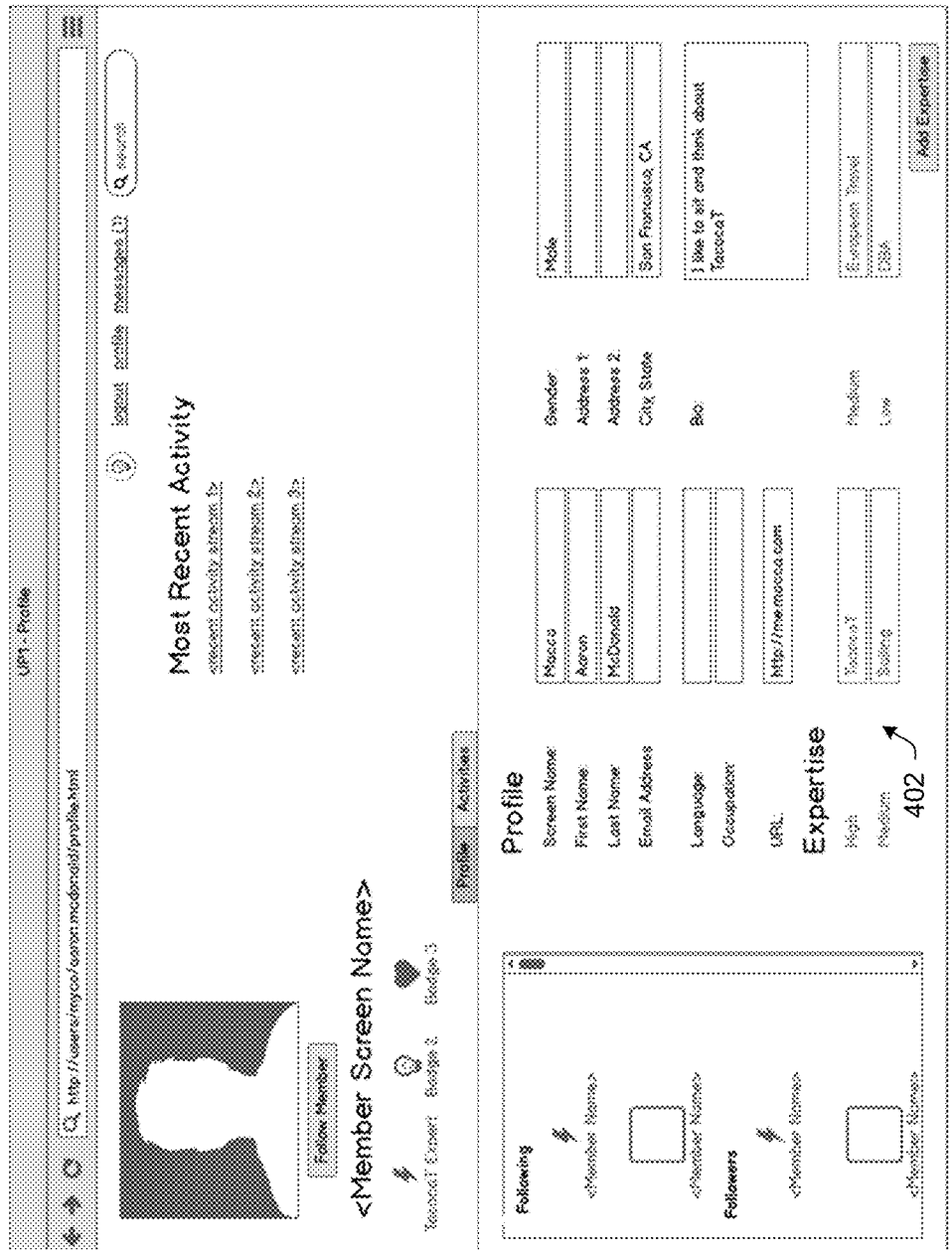
FIGS. 4 and 5 depict user interfaces showing example uses of the user competency score.
Figure 5:
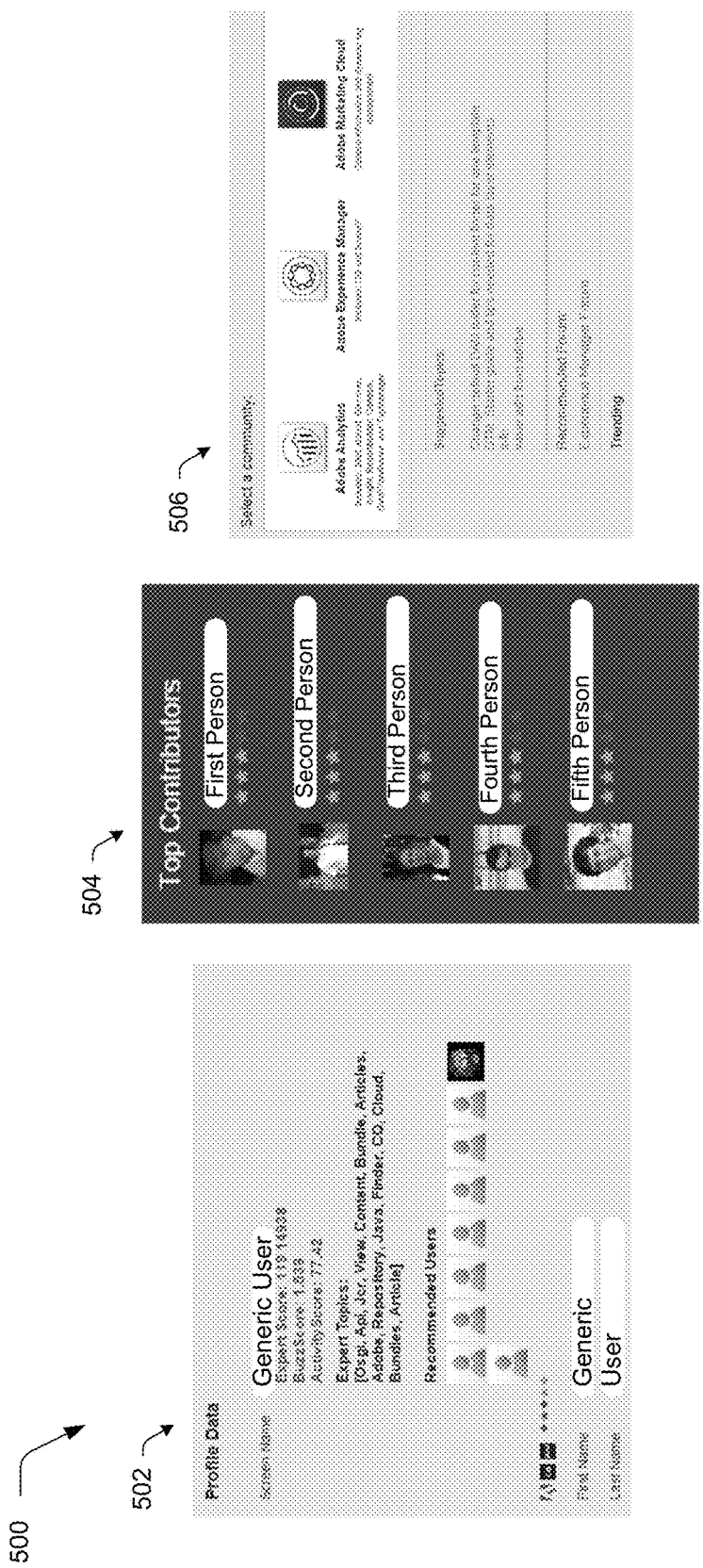

FIG. 2 depicts a system 200 in an example implementation showing operation of the competency determination module 120 of FIG. 1 in greater detail. FIG. 3 depicts a procedure 300 in an example implementation in which a level of competency (e.g., as represented by a "user competency score") is determined based on an amount of participation exhibited by a user as part of an online community and relevancy of the digital content to a topic of the online community. FIGS. 4 and 5 depict user interfaces 400, 500 having example uses of the user competency scores.

Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-5.

Online communities provide a technique in which users may share digital content 116 related to particular topics, e.g., user interests, needs, expertise, particular subject matter, and so on via a network 108. As such, relevancy of digital content 116 provided by the user as part of the online community in relation to the topic is used in the following as part of a determination of a user competency score, e.g., to identify whether the user is an "expert," "novice," and so forth.

The topic, for instance, may be defined as an area of expertise, e.g., a set of domains or forums, for which the user competency score is determined. For example, it is the context for which an identification for an "expert" may be carried out. A topic may relate to simple technical terms (e.g., "C++ programming") or broader areas, such as "analytics," which in turn includes sub topics such as "clickstream data," "page visits," and "bounce rate." The techniques described herein are scalable to various granularities, e.g., levels in a hierarchy. In the following, the topic is described as a namespace or specific action that is defined by an administrator, moderator, or entirety of the online community although the other examples above are also contemplated for use in the following.

The user competency score is also based in the following on participation of the user as part of the online community, e.g., interaction as part of the online community. Participation is measurable in a variety of ways, such as number of posts, views of posts, and so forth. In one example, a user's participation within the online community is defined independent of the topic, e.g., quality or knowledge of the user in relation to the topic. Other examples are also contemplated in which participation is defined in relation to the topic, e.g., as expert analysis.

Accordingly, in this section a user competency score is determined that is based on relevancy of the digital content 116 provided by the user to a topic of the online community. Additionally, the user competency score also addresses participation of the user based on interaction within the online community, including when and how much of this digital content is provided, e.g., "posted." In this way, the user competency score quantifies user influence as a function of participation and relevancy of online community participation.

To begin, a community content determination module 202 is employed to identify digital content that pertains to the topic of the online community being examined, i.e., the community digital content 204. This community digital content 204 is then used to determine relevancy by the community content determination module 206 of digital content provided as part of the online community as a whole as well as relevancy of digital content provided by a user for which a user competency score is being determined.

An engagement collection module 208 is also employed to detect amounts of participation (e.g., activity counts 210) with the online community, e.g., a number of posts, views of posts, questions, answers, and so forth. The amounts of participation (e.g., the activity counts 210) are then employed by the community engagement determination module 212 to determine participation of the user as part of the online community.

In order to determine a relevancy portion of the user competency score, the community content determination module 206 generates a user content object 214 that defines an amount of relevancy of digital content originated by a user in relation to the topic of the online community (block 302). The user content object 214, for instance, may define a numerical value that is based on distribution of digital content 116 originated by the user in relation to a topic of the online community, type of digital content 116 originated by the user, relevancy and staleness of digital content 116 originated by the user, and so forth. In one example, semantic relevancy is determined by the community content determination module 206 of the digital content originated by the user to the topic, which is used to generate the user content object 214. For example, words included in text originated by the user are compared to words used as part of the online community as a whole to determine the semantic relevancy of user originated digital content to the topic of the online community. In another example, the user content object 214 is based on a number of items of the digital content that are used to answer a question as part of the online community versus a number of items of the digital content that are used to ask a question as part of the online community.

In an implementation, the community content determination module 206 also determines a community content object 216 that defines an amount of relevancy of digital content of the online community as a whole to the topic. In this implementation, both the user content object 214 and the community content object 216 are used by a user content score determination module 218 to determine a user content score 220 that describes relevancy of the digital content originated by the user to the topic of the online community. For example, the user content score 220 may be based on a proportion of user content object 214 (e.g., the relevant user's digital content) to relevant content of the community content object 216. In other words, this defines an amount of the relevant digital content of the online community that is originated by the user. Other examples are also contemplated in which the user content score 220 is determined from the user content object 208 without use of the community content object 214, i.e., is based solely on relevancy of the digital content originated by the user to the topic.

A user participation object 222 is determined that defines an amount of participation exhibited by the user as part of the online community (block 304). The user participation object 222 quantifies interaction of the user with the online community. The user participation object 222, for instance, may be configured to quantify a user's overall interaction with the online community, e.g., activity counts 210 regardless of relation to the topic. In another example, the user participation object 222 may also quantify a user's interaction with the online community for the particular topic. This may be performed through analysis of the user content object 214 that describes the digital content originated by the user as part of the online community to generate the user participation object 222 to determine a number of interactions that pertain to the topic. The user participation object 222 may also be configured to downgrade participation that involves more questions than answers (e.g., through use of question and answer counters) or includes incorrect digital content, e.g., through analysis of replies to the user's posts.

A user competency score 226 is determined that defines a level of competency of the user in relation to the topic. The determination of the user competency score is based on the user content object 214 and the user participation object 222 (block 306). A score determination module 224, for instance, may base relevancy on a user content score 220 that is further based on the community content object 216 and the user content object 214. Accordingly, in this example the user competency score is based indirectly on the user content object 214. In another instance, the user content score 220 is based directly on the user content object 214 and not the community content object 216 as previously described. The score determination module 224 determines participation based on the user participation object 222 as described above. In this way, both relevancy and participation are quantified by the score determination module 224 as the user competency score 226.

Accordingly, the user competency score 226 is a measure of quality and quantity of knowledge relating to a particular topic. The topic is an area of expertise as described above. A variety of components are used by the score determination module 224 to determine the user competency score 226. A first of which is a relevancy of digital content originated by the user to the topic, either directly through use of the user content object 214 or indirectly through use of the user content score 220. These include features such as topic distribution, type of content, content relevancy and staleness, and so forth. This may also include community participation with the topic, as defined by the community content object 216. A user's participation is also employed through use of the user participation object 222. In this way, the user competency score 226 quantifies whether does the user post and interact in a context of the topic and does the topic involve a significant portion of the interaction of the online community. The user competency score 226 may also be configured to quantify whether the community acknowledge the contribution of the user through detection of replies, up votes, and other interactions with digital content posted by the user.

Generation of subsequent digital content that is to be used as part of interaction of the user with the online community is controlled based at least in part on the determined user competency score (block 308). The interaction control module 128 of FIG. 1, for instance, may generate subsequent digital content as indications that a user is considered an expert or novice (e.g., a badge) based on the user competency score 226. An example of indications 402 included in a user interface 400 as part of a user profile 400 is illustrated in FIG. 4 in which different expertise relating to different topics is shown. In FIG. 5, user interface 500 includes examples that employ indications of a level of competency. The examples include recommendations of experts 502 in a given topic, a ranking 504 of top experts (e.g., contributors) within the online community, and recommendations of topics 506 to the user based on the user competency score 226.

The score determination module 224 may employ scoring criteria such as scale, rate, and range of the user competency scores for users that participate as part of the online community. As part of this, a threshold is defined as an expertise point, at which a score higher than the threshold classifies a user as an expert in that topic. The above components are captured by the following expressions:

IntermediateScore(Topic,User)=(usercontentdistance (topic)*communityuserdistance(Topic))/Significance(Topic);

and

ExpertScoreThreshold(Topic,User)=ScoreFunction (Range,Scale,IntermediateScore)

A variety of other examples of control of user interaction based on the user competency score 226 are also contemplated. In one example, a ranking is assigned to the user that is displayable as part of the online community based on the user competency score 226, e.g., as part of a "top experts" or "top contributors" list as shown in the ranking 504 example of FIG. 5. In another example, groupings are formed that include the user with other like users based on the user competency scores 226 formed as part of the online community, e.g., to form "expert" and "novice" sub-communities. In a further example, the user competency scores 226 are used as a basis to recommend other digital content to the user, e.g., to recommend detailed technical manuals to "expert" users and tutorials to "novice" users.

A variety of other scoring functions may also be used. For example, the intermediate score determined above based on different features may be fit into an exponential function with a predefined range, e.g., 0-100, or in a sigmoid curve with a range of −100 to +100. This provides a flexibility to a manger of the online community based on how conservative the manager wants the expert levels and rankings to be assigned, e.g., to penalize or reward users. The scoring function may also be driven by real world considerations. In order to identify spammers, a function may be used with a lower penalty that places high reward on positive activity, through use of a high penalty for negative activity, and so forth. A variety of other examples are also contemplated. Having now described an example of computation of a user competency score, examples of control of when to use the user competency score to control interaction with the online community is described in the following and shown in corresponding figures.

Stability and User Competency Level Determinations

Figure 6:
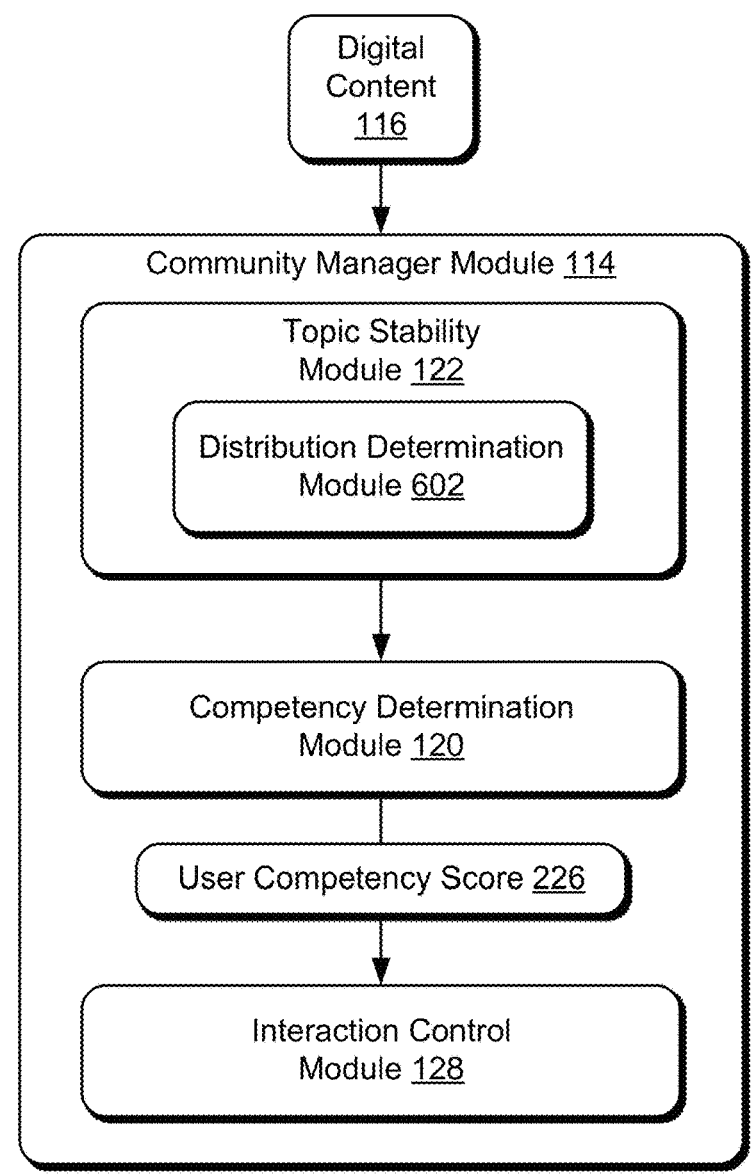
FIG. 6 depicts a system in an example implementation showing operation of a topic stability module of FIG. 1 in greater detail.
Figure 7:
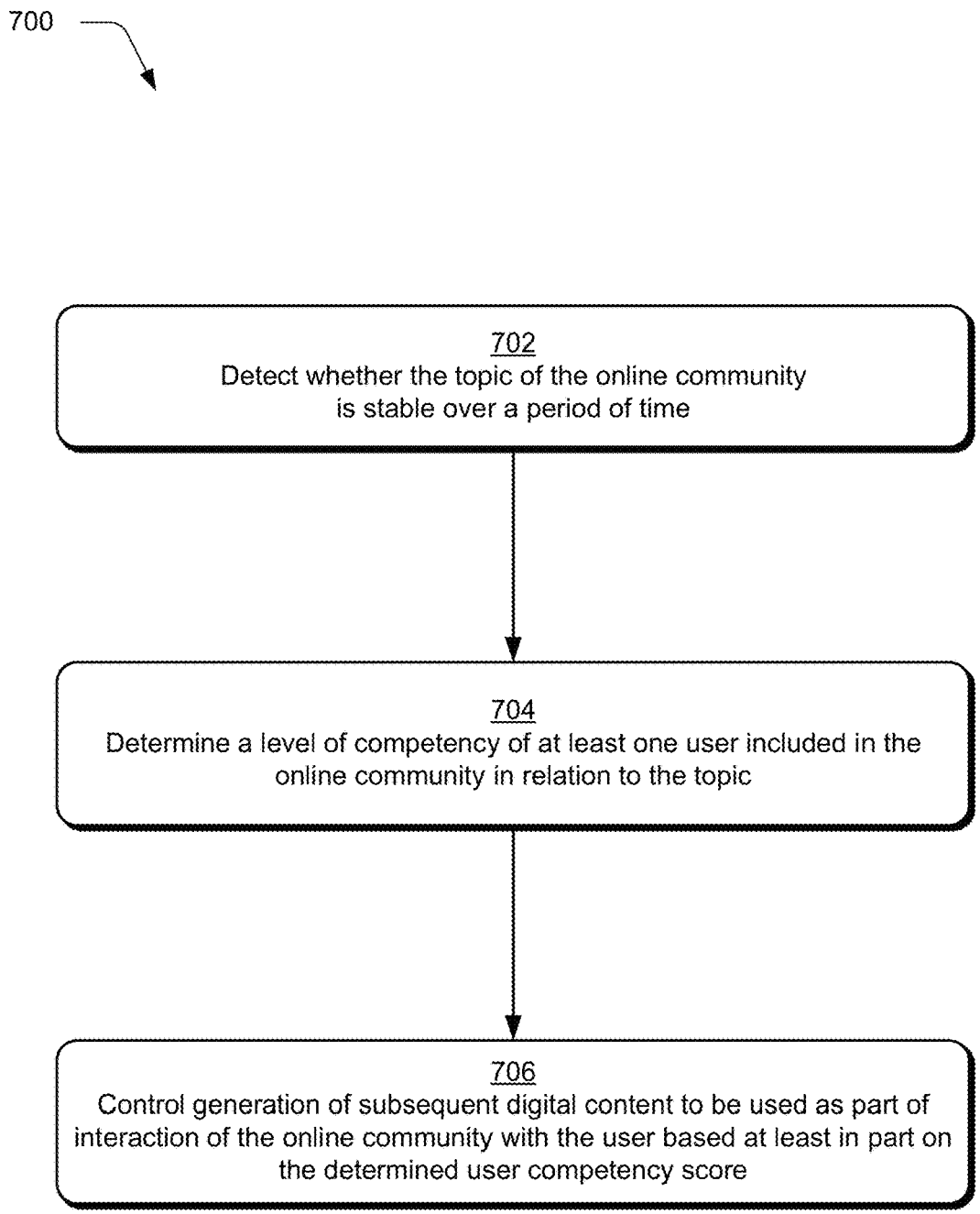
FIG. 7 is a flow diagram depicting a procedure in an example implementation in which a determination of stability is first made to control subsequent interaction of users as part of an online community based on determined levels of competency.

FIG. 6 depicts a system 600 in an example implementation showing operation of the topic stability module 122 of FIG. 1 in greater detail. FIG. 7 depicts a procedure 700 in an example implementation in which a determination of stability is first made to control subsequent interaction of users as part of an online community based on determined levels of competency.

Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 6-7.

As previously described, users interact as part of an online community in relation to a particular topic. Over time, however, the topic may change. Accordingly, conventional rule-based techniques may erroneously assign expertise to users regardless of the topic being addressed by the users or even changes to that topic. Conventional rule-based techniques are based on tens and even hundreds of individual rules that are manually entered by an administrator of the online community in order to assign levels of competency to users of the online community, e.g., different levels of badges. Accordingly, these conventional rule-based techniques may involve significant amounts of manual interaction to address changes in the online community. Thus, inefficiencies cause by this manual interaction may make it infeasible to address these changes as they occur.

For example, consider an online community that discussed the topic of "baseball" five months ago. Experts in this community at that point in time therefore have relatively high user competency scores in relation to the topic "baseball." Over time, however, the online community may transition to the discussion of "restaurants" instead. Conventional rule-based techniques may not be able to address this change.

Another example involves a "cold start" problem in which an insufficient amount of digital content 116 is available in order to accurately determine levels of expertise. For example, it may not be possible to determine which of the users are to be considered an "expert" due to large fluctuations in user competency scores based on this lack of digital content. In a conventional technique that relies solely on a threshold (e.g., assign a badge to every user with a score over 70), for instance, this may cause erroneous assignment of the badges due to these fluctuations.

Accordingly, the community manager module 114 includes a topic stability module 122 in this example. The topic stability module 122 is implemented at least partially in hardware to detect whether the topic of the online community is considered stable over a period to time (block 702) such that control of user interaction with the online community may be accurately based on the user competency scores.

In order to do so in this example, the topic stability module 122 analyzes digital content 116 shared as part of the online community, e.g., posts, messages, and so forth. As part of the analysis, a distribution determination module 602 is used to measure a change in a distribution of the digital content 116 shared as part of the online community. This change identifies a switch from one topic of the online community to another topic as reflected in the digital content 116 over time.

As new digital content 116 is posted to the online community, for instance, the distribution determination module 602 measures how different this new digital content 116 is from previously posted digital content 116. One way to do so is to observe trends of word usage of the topic as part of the digital content activity over the period of time. The distribution determination module 602 may then determine variation of the observed trends of the word usage and detect whether the topic is stable by comparing the determined variation to a threshold amount of variation. This may also be used to determine whether user participation as part of the online community is stable in a similar way, e.g., through detection of fluctuations of user activity in relation to the online community.

In order to determine the variation of the observed trends of the word usage, the words may be represented as a distribution (e.g., histogram) of occurrences along with an assigned relative importance of the words to a respective topic. The importance, for instance may be quantified by how many votes involve the word, how many responses include the word, and which users of the online community use the word.

To monitor the relative change in the importance of the content, the distribution determination module 602 may employ a statistical test (e.g., zTest) to monitor and compare variances of two distributions. If the statistical test of the distribution determination module 602 indicates that the digital content 116 is stable (e.g., low variance) and user participation is stable (e.g., also has low variance) then the online community as a whole is considered stable with a confidence interval of ninety-five percent.

A competency determination module 120 is also employed as previously described to make a determination as to a level of competency of at least one user included in the online community in relation to the topic (block 704), e.g., to determine the user competency score 226. This may be performed in response to the determination of stability of the topic to ensure correct determination of the correct score for the correct topic in the case of change. This may also help to protect against the cold start problem as previously described by ensuring that a sufficient amount of digital content 116 is available to accurately determine the user competency score 226. Other examples are also contemplated in which the user competency score 226 is determined without waiting for this determination of stability.

An interaction control module 128 is then employed to control generation of subsequent digital content to be used as part of interaction of the online community with the user based at least in part on the user competency score 226 (block 706). As before, this subsequent digital content may include badges, ranked lists, content and user recommendations, and so forth.

Additionally, this control is performed responsive to detecting that the topic is stable and in this way promotes use of accurate determinations of a level of competency. For example, the competency determination module 120 may be configured to generate user competency scores 226 as previously described once a determination is made that the topic is stable. In this way, the user competency scores 226 used to control interaction are not made available to the interaction control module 128 until this determination of stability. In another example, the user competency scores 226 are provided without waiting for this determination, but the interaction control module 128 waits to implement this control until the stability determination is made by the topic stability module 122. In this way, stability of the topic may also be used to ensure to promote accuracy of determination of the level of competency and subsequent control of interaction of the user based on this determination. A variety of other examples are also contemplated.

Dormant User Identification and User Competency Level Determinations

Figure 8:
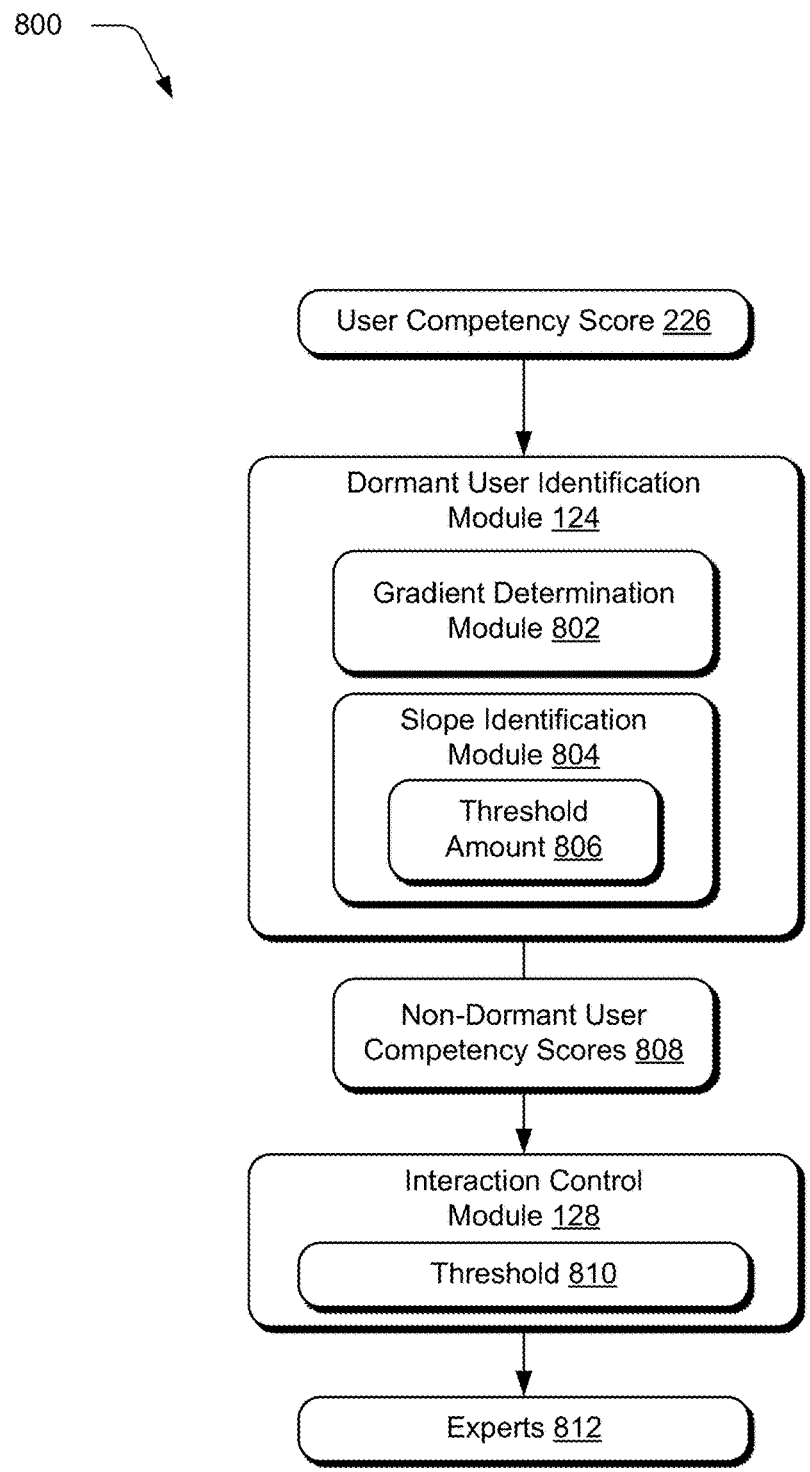
FIG. 8 depicts a system in an example implementation showing operation of a dormant user identification module of FIG. 1 in greater detail.
Figure 9:
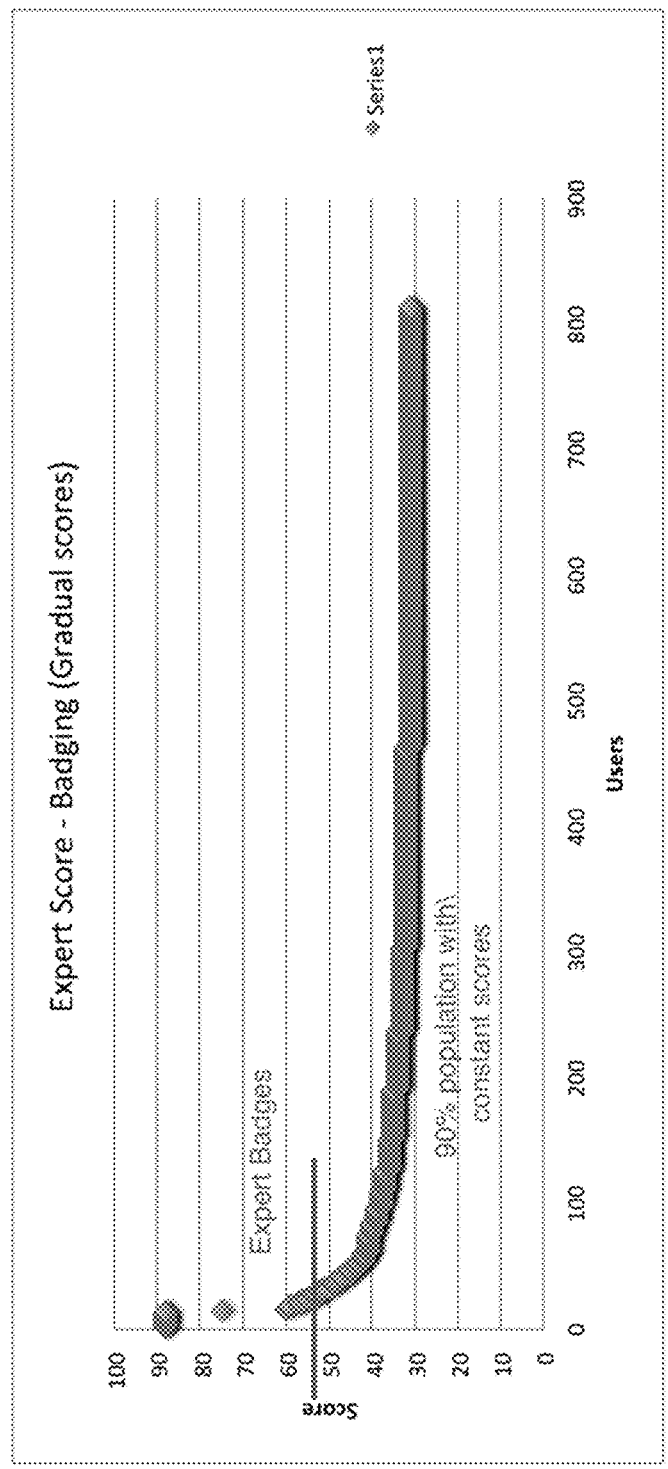
FIGS. 9 and 10 depict graphs usable to identify users having at least a defined level of expertise in relation to a topic of an online community.
Figure 10:
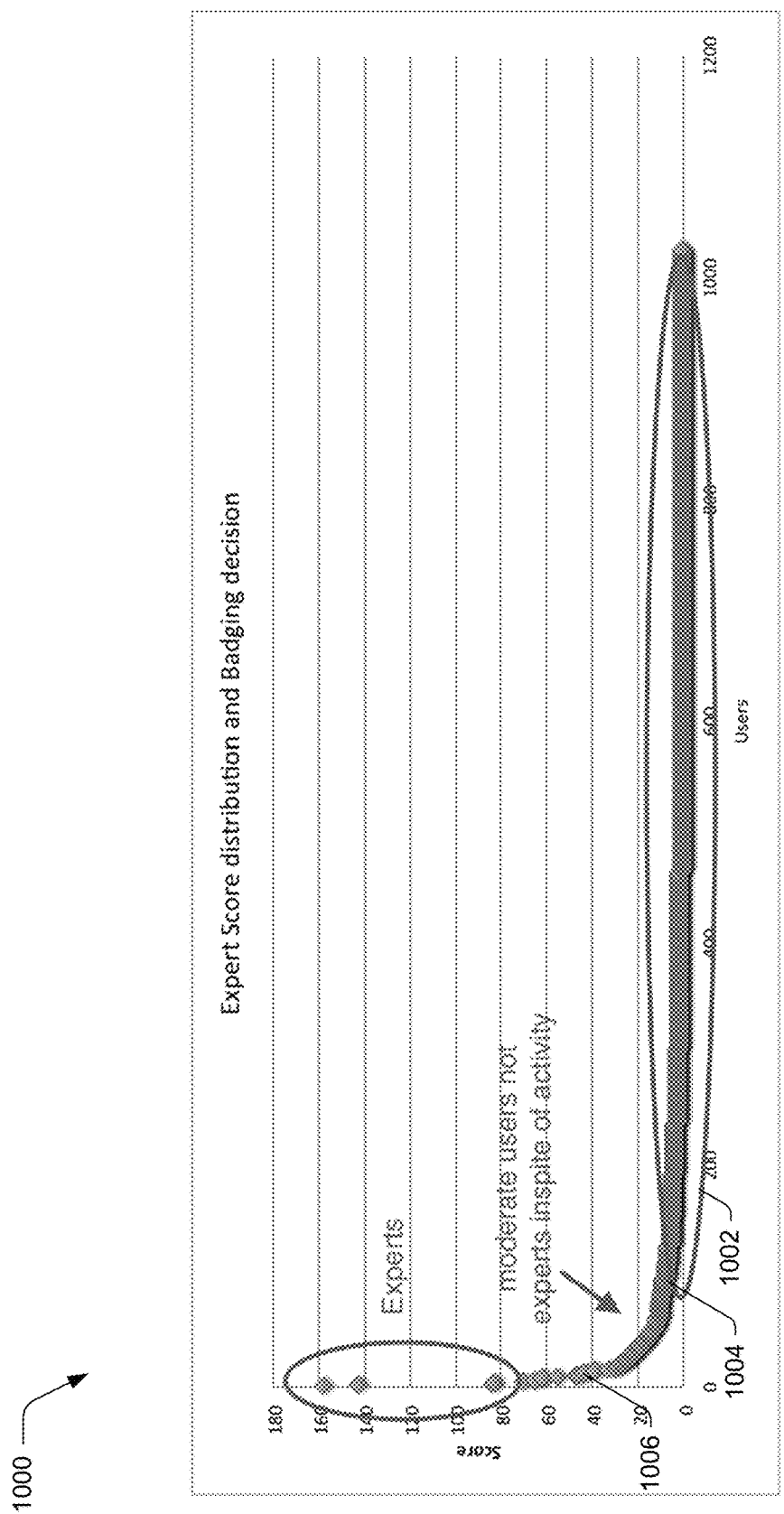

FIG. 8 depicts a system 800 in an example implementation showing operation of the dormant user identification module 124 of FIG. 1 in greater detail. FIGS. 9 and 10 depict graphs 900, 1000 usable to define users have at least a defined level of expertise in relation to a topic of an online community, e.g., are "experts."

Large online communities typically include a large number of users that exhibit low performance, e.g., minimal activity and/or relevancy to the topic of the online community. These users, referred to dormant users in the following, reduce both the health and the quality of digital content 116 shared as part of the online community. For example, this lack of quality may cause a reduction in a mean score of the digital content 116 that describes relevancy of the digital content 116 overall to the topic. Hence, the lack of quality may cause introduction of an unchartered bias that then affects accuracy of control of subsequent user interaction, such as how to assign expert badges to users that are part of the online community.

Accordingly, in this example a dormant user identification module 124 is employed by the community manager module 114 of FIG. 1. The dormant user identification module 124 is implemented at least partially in hardware to identify which users of the online community are considered dormant or not-dormant. In the following, this is based on user competency scores 226 generated by the competency determination module 120. To do so, the dormant user identification module 124 first detects a dormant user group (e.g., as a long tail 1002 as shown in the graph 1000 of FIG. 10) and then adjusts subsequent determinations in which the dormant users are ignored as part of the determinations.

This may be performed in a variety of ways. In one example, a gradient determination module 802 is implemented at least partially in hardware to determine a gradient of user competency scores 226 of users that are included in the online community as an ordering of largest to smallest user competency scores for the users as shown in FIGS. 9 and 10.

A slope identification module 804 is implemented at least partially in hardware to identify a change in a slope of the gradient over a threshold amount 806. The change in slope is indicative of which of the users of the online community are dormant and which of the users of the online community are not dormant. As shown in FIG. 10, for instance, a change in slope 1004 over a threshold amount 806 in the user competency scores is used to make a distinction between dormant users included in the "long tail" 1002 having user competency scores below this change in slope 1004 and non-dormant users 1006 having user competency scores above this change in slope 1004 in the gradient. Other examples of identification of dormant and non-dormant users includes sampling data from the user competency scores 226 using a sliding window approach to detect this change.

Once dormant and non-dormant users are detected, the dormant user identification module 124 removes the user competency scores 226 of the dormant users, leaving the user competency scores 808 of the non-dormant users. The non-dormant user competency scores 808 are then used by the interaction control module 128 to control interaction of the non-dormant users as part of the online community.

For example, the interaction control module 128 may identify a threshold 810 that is used to assign an indication that is display as part of a user's interaction with the online community, e.g., a badge. The threshold 810, for instance, may be used to identify which of the users are considered experts 812 from the non-dormant user competency scores 808 without encountering the potential bias that may be introduced by dormant users as previously described. Continuing with the previous gradient example, the long tail 1002 identified in FIG. 10 is removed and then a gradient descent technique is used to identify a subset of the non-dormant users that are to be assigned corresponding indications of a level of competency, e.g., badges indicative of experts 812.

In some instances, it may be desirable to also identify and reward users that are not yet considered experts but are on their way to becoming one. For example, an online community may include silver and gold badges that are indicative of successive levels of expertise. In such an instance, the thresholds of user competency scores used to assign these badges are processed to give a gradual curve to the thresholds indicative of the experts, e.g., if "x" number of users from the first percentile (expert group) then "x*1.5" or more number of users are rewarded with the next grade. This acts to encourage more users to contribute to the online community. The rate of badging may also follow a negative exponential curve, the slope of which is algorithmically derived based on identification of the long tail 1002 and definition of the reward thresholds above.

Accordingly, in this example the dormant user identification module 124 detects which of the users of the online community are not dormant from the user competency scores. The user competency scores of the dormant users are then removed from further determination, leaving the user competency scores of the non-dormant users. The interaction control module then identifies a threshold based on the user competency scores of the users that are not dormant, e.g., a threshold to assign "expert badges" based on a change in gradient, identification of a subset of highest scores, and so forth. The threshold is then compared to the user competency scores and used to assign an indication of the level of competency to at least one user of the users. The indication is displayable as part of interaction of the at least one users with the online community, e.g., as a badge, ranking, and so forth as previously described. Having now described techniques to remove a bias of dormant users, techniques are described in the following to address aging of digital content used in order to adjust user competency scores.

Decay Factor Usage and User Competency Level Determinations

Figure 11:
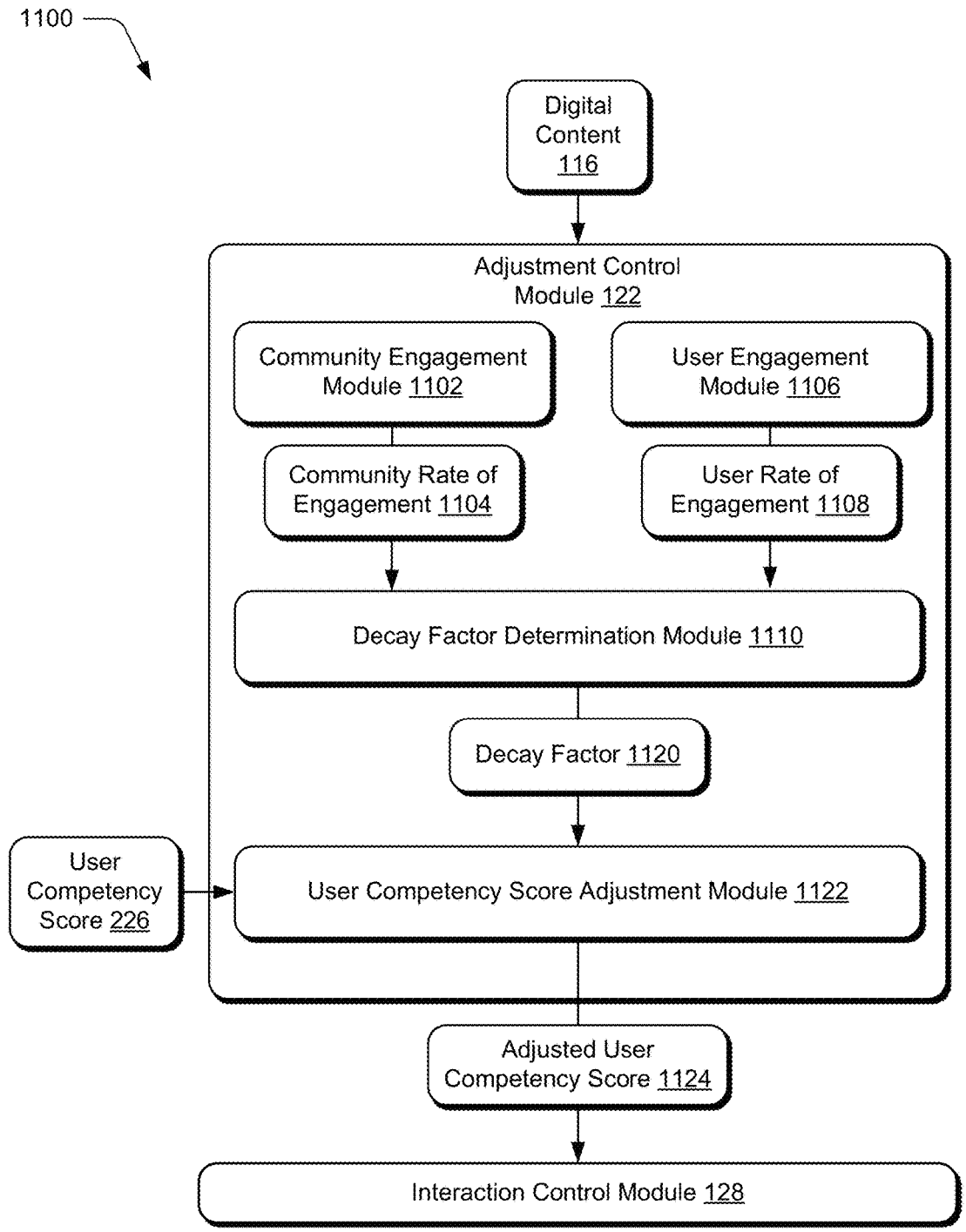
FIG. 11 depicts a system in an example implementation showing operation of an adjustment control module of FIG. 1 in greater detail in a user-specific reward adjustment scenario.
Figure 12:
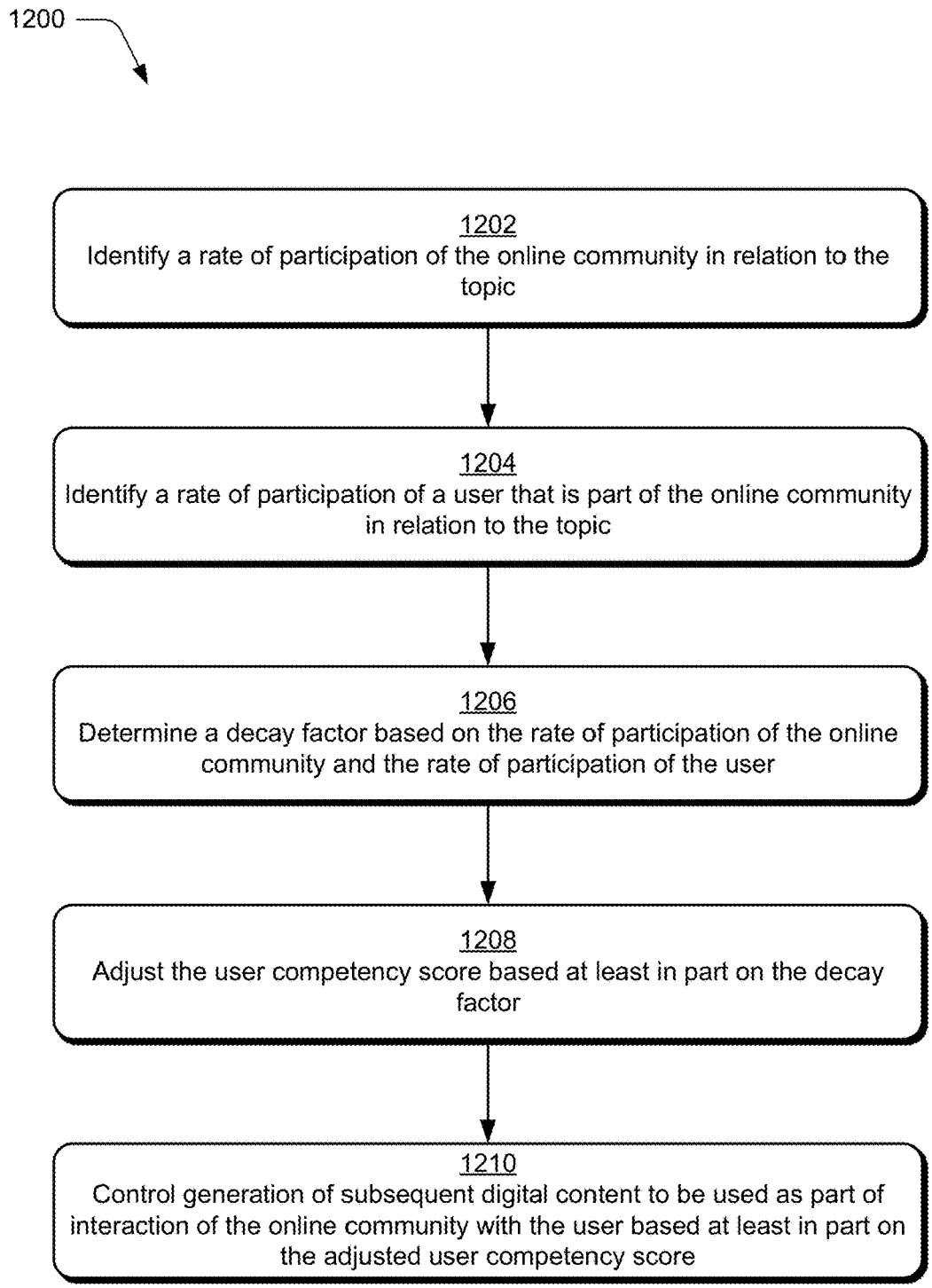
FIG. 12 is a flow diagram depicting a procedure in an example implementation in which a decay factor is used to adjust user competency scores in a manner that is user specific.
Figure 13:
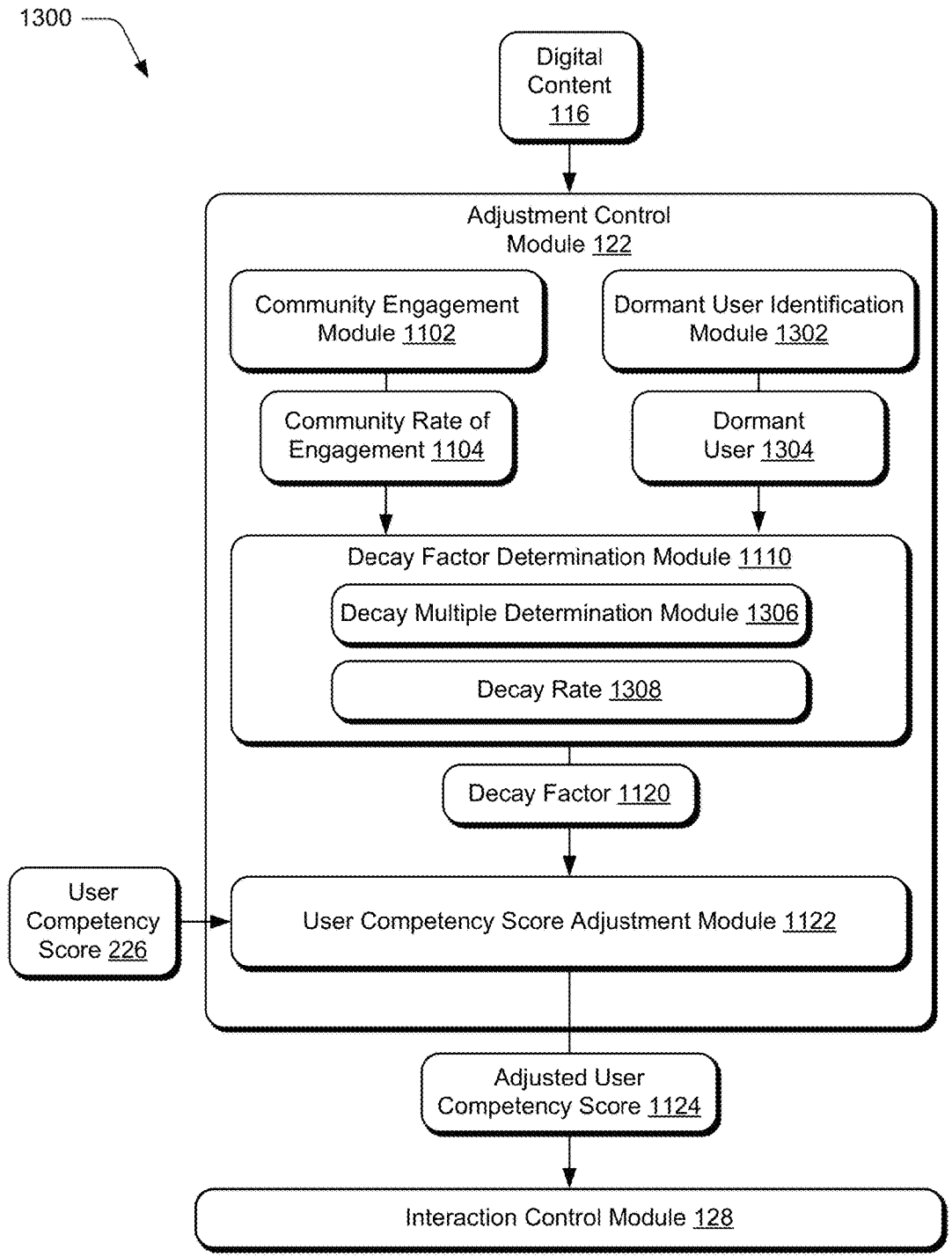
FIG. 13 depicts a system in an example implementation showing operation of the adjustment control module of FIG. 1 in greater detail in a community-generic reward adjustment scenario.
Figure 14:
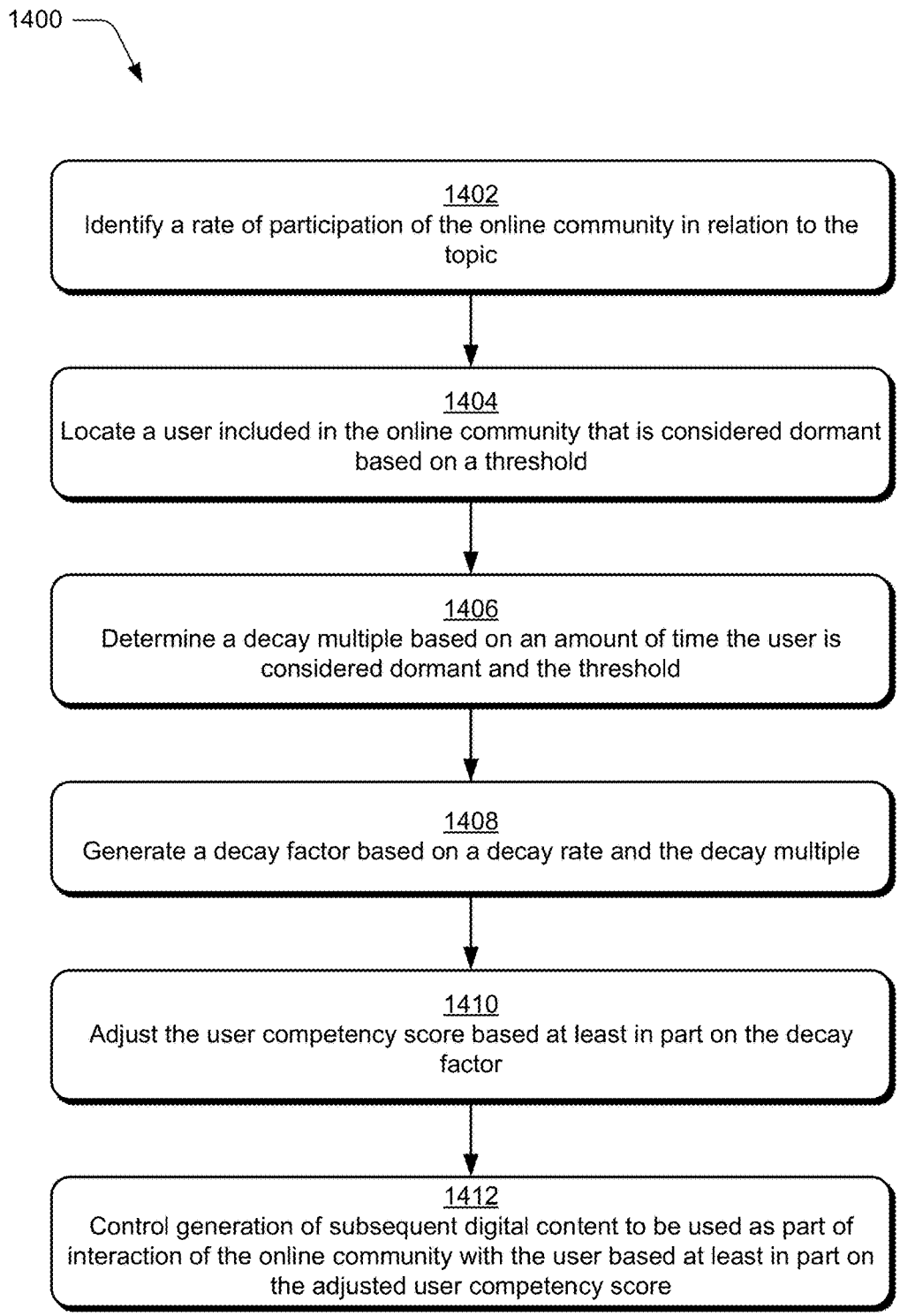
FIG. 14 is a flow diagram depicting a procedure in an example implementation in which a decay factor is used to adjust user competency scores in a manner that is community generic.

FIG. 11 depicts a system 1100 in an example implementation showing operation of the adjustment control module 126 of FIG. 1 in greater detail in a user-specific reward adjustment scenario. FIG. 12 depicts a procedure 1200 in an example implementation in which a decay factor is used to adjust user competency scores in a manner that is user specific. FIG. 13 depicts a system 1300 in an example implementation showing operation of the adjustment control module 126 of FIG. 1 in greater detail in a community-generic reward adjustment scenario. FIG. 14 depicts a procedure 1400 in an example implementation in which a decay factor is used to adjust user competency scores in a manner that is community generic.

Aspects of the procedures may be implemented in hardware, firmware, software, or a combination thereof. The procedures are shown as a set of blocks that specify operations performed by one or more devices and are not necessarily limited to the orders shown for performing the operations by the respective blocks. In the following discussion, reference is made interchangeably to FIGS. 11-14.

As previously described, user competency scores may be used to control interaction of users that participate as part of an online community, such as to provide badges, rankings, and other rewards that encourage the users to participate further as part of the community. However, it is common for a majority of the users of large online communities to be dormant, i.e., inactive. Accordingly, this dormancy may give false and stale notions of levels of competency, especially if not corrected over time. For example, a user may have gained an "expert" level of competency based on interaction as part of the online community that occurred a number of years ago. However, this user may not have participated as part of the online community, at least in significant amounts, since then. If this is not addressed, this user may still be recognized erroneously as an expert.

Accordingly, techniques are described herein that provide a mechanism to decay a basis of user competency score determination over time. This may be performed for dormant users and even for all users such that an effect of digital content on determination of the user competency score takes age of the digital content and participation related to that content into account. For example, expertise may be penalized proportionally to a rate of change of community content and past expertise in order to ensure that the user competency scores are adjusted to reflect potential staleness of digital content 116 used to construct the user competency scores.

Consider a first user who has one thousand posts in a first year and zero posts in a second year and a second user that has similar content quality but two posts in the first year and eight hundred posts in the second year. Both users post content that is similar in this example and thus support similar scores as described previously. In the beginning of the second year, the first user will have a higher user competency score than the second user. This may be the case even though the digital content shared by the first user may be stale and incorrect. For instance, the first user's score may be relevant in the first year while the rest of the online community was aligned with the first user's content, whereas the second user's score may be more relevant currently as it aligns with current topics of the online community's digital content.

To correct for these errors, such as for high erroneous scores for old irrelevant content and stale information, the techniques described in this section decay (e.g., penalize) the first user's score such that the first user's score would be much lower than the second user's score at the end of the second year. This makes the scores comparable and accurate to current topics of the online community and thus provides a mechanism to keep the user competency scores "up to date."

The techniques described in the following leverage an intuition that a rate of change of a user competency score is a projection of the user's participation based on the past behavior, behavior of the online community, and a desired penalty, i.e., a decay rate. Therefore, the decay rate may be used to adjust how much to penalize participation as these participations age. For example, an administrator of the online community that desires to find "top performers" may use a high decay rate whereas in order to motivate user participation over time the administrator may choose a lower and more gradual decay rate.

A variety of techniques may be used to adjust the user competency scores. In one example, user competency scores are adjusted a manner that is user specific as described in relation to FIGS. 11-12. In another example, user competency scores are adjusted in a manner that is generic to the online community as described in relation to FIGS. 13-14.

As shown in the FIG. 11, the adjustment control module 122 receives digital content 116 that is used to determine the amount of adjustment to be made to a user competency score, which is defined as a decay factor. In order to do so, a rate of participation is identified of the online community in relation to the topic (block 1202). A community engagement module 1102 is implemented at least partially in hardware to determine a community rate of participation 1104 from the digital content 116. This may be based at least in part on frequency of posts of digital content 116 as part of the online community as a whole. In order to address relevancy of those posts to the topic of the online community, centrality of user participation that describes amounts of relevancy of the posts with respect to the topic may be determined through use of a distribution to determine "how close" words used by the user are to the topic of the online community.

Likewise, a rate of participation is identified of a user that is part of the online community in relation to the topic (block 1204) and thus is specific to the user. A user engagement module 1106 is implemented at least partially in hardware to determine a user rate of participation 1108 from the digital content 116, as contrasted with the community rate of participation 1104 of the online community as a whole. This may also be based at least in part on frequency of posts of digital content 116 of the user. In order to address relevancy of those posts to the topic of the online community, centrality of user engagement may also be used that describes amounts of relevancy of the posts of the user with respect to the topic.

The community engagement module 1102 may also determine an inactivity threshold that is used to identify dormant users based on participation of the online community as a whole. The inactivity threshold, for instance, is identified as an amount of time, beyond which, users that have not participated as part of the online community are considered dormant. This may be determined in a variety of ways, such as based on an age of the online community and an average activity rate of the users as part of the online community.

A decay factor is determined based on the rate of participation of the online community and the rate of participation of the user (block 1206). A decay factor determination module 1110 is implemented at least partially in hardware to accept inputs of the community rate of participation 1104 and the user rate of participation 1108 and from these, compute a decay factor 1120 that is to be used to adjust the user competency score 226. In this way, the penalty applied by the decay factor 1120 is user-specific in that the penalty addresses user participation and also addresses participation of the online community as a whole.

The user competency score 226 is then adjusted based at least in part on the decay factor 1120 (block 1208) to form an adjusted user competency score 1124, which is then used to control generation of subsequent digital content for use as part of interaction of the user with the online community (block 1210). This may be performed for all users of the online community or for dormant users, solely. For example, the threshold determined by the community engagement module 1102 as described above may be used to define which of the users of the online community are considered dormant User competency scores of those dormant users are then adjusted using the decay factor 1120, with no such adjustment being performed for the non-dormant users.

Mathematically, for a user-specific reward adjustment function in this example the community engagement module 1102 determines the community rate of participation 1104 as follows:

$$\text{avg\_community\_post\_frequency} = \text{Sum}(\text{user\_post\_frequency})/\text{count\_users}$$

which defines on average, how frequently does the online community participate (e.g., post) using digital content 116 as part of the online community as a whole.

The user engagement module 1106 determines a user rate of participation 1108 that describes frequency of participation of the user as part of the online community. This is determined by taking an average time between consecutive participations, e.g., post frequency, which may be represented as follows:

$$\text{user}(i)\_\text{post\_freq}$$

In order to define the inactivity threshold of when a user is considered dormant (e.g., inactive), the community rate of participation 1104 and the user rate of participation 1108 are used as defined in the following expression:

$$\text{inactiveUserTime}(\text{user}\_i) = 1.5 * \min(\text{avg\_community\_post\_frequency}, \text{user}(i)\_\text{post\_freq})$$

As previously described, other examples are also contemplated in which adjustment is made regardless of whether the user is dormant.

As part of determination of the decay factor 1120, the decay factor determination module 1110 may compute a decay multiple and employ a decay rate. The decay multiple is based on an amount of time the user is considered inactive according to the inactivity threshold as follows:

$$\text{decayMultple}(\text{user}\_i) = (\text{currentTime} - \text{lastPostTime}(\text{user}\_i))/\text{inactiveUserTime}(\text{user}\_i)$$

The decay rate may be specified manually by a user, such as an administrator of the online community to specify how conservatively the user competency scores are to be penalized/rewarded as described earlier.

The user competency score adjustment module 1122 then adjusts the user competency score 226 based on the decay factor 1120 as follows:

$$\text{decayedScore}(user\_i) = \text{currentScore}(user\_i) * (e\char`\^-(\text{decayMultple}(user\_i)/\text{decayRate}))$$

The decay rate quantifies how fast the reward/score is reduced to 0/min Value.

Thus, in this example the adjustment is user specific and may be applied solely to dormant users or all users to address aging of participation as part of the online community. In the following example, the adjustment is generic to the online community and may also be applied solely to dormant users or all users to address aging of participation as part of the online community as further described in the following.

The system 1300 is FIG. 13 is configured to perform community generic adjustments to users that are identified as dormant A rate of participation is identified of the online community in relation to the topic (block 1402). As before, the community engagement module 1102 is implemented at least partially in hardware to determine a community rate of participation 1104 from the digital content 116. This may be based at least in part on frequency of posts of digital content 116 as part of the online community as a whole. An example expression usable to determine the community rate of participation 1104 is represented as follows:

$$\text{Avg\_community\_post\_frequency} = \text{Sum}(\text{sampled\_user\_post\_frequency})/\text{count\_sample\_users}$$

A user is located that is included in the online community that is considered dormant based on a threshold (block 1404). A dormant user identification module 1302, for instance, may define an inactivity threshold as a function of community rate of participation 1104 as follows:

$$\text{inactiveUserTime} = 1.5 * \text{avg\_community\_post\_frequency}$$

The inactivity threshold is then used by the dormant user identification module 1302 to identify the dormant user 1304 with respect the threshold, e.g., the user has not participated as part of the online community within an amount of time specified by the inactivity threshold. User competency scores 226 of the dormant users 1304 are then adjusted as follows in this example, whereas user competency scores 226 of non-dormant users are not adjusted thereby reducing resource consumption. Other examples are also contemplated as described above.

The decay factor determination module 1110 is then employed to determine the decay factor 1120. To do so in this example, a decay multiple determination module 1306 is implemented at least partially in hardware to determine a decay multiple based on an amount of time the user is considered dormant and the inactivity threshold (block 1406). The decay multiple determination module 1306, for instance, may determine the decay multiple in accordance with the following expression:

$$\text{decayMultple}(user\_i) = (\text{currentTime} - \text{lastPostTime}(user\_i))/\text{inactiveUserTime}(user\_i)$$

The decay rate 1308 may be specified manually by a user, such as an administrator of the online community to specify how conservatively the user competency scores are to be penalized/rewarded as described earlier.

A decay factor 1120 is generated based on a decay rate and the decay multiple (block 1408), which may be expressed as follows:

$$(e\char`\^\text{decayMultple}(user\_i)/\text{decayRate})$$

A user competency score 226 is then adjusted that defines a level of competency of the user in relation to the topic based at least in part on the decay factor (block 1410) to arrive at an adjusted user competency score 1124 as follows:

$$\text{decayedScore}(user\_i) = \text{currentScore}(user\_i) * (e\char`\^\text{decayMultple}(user\_i)/\text{decayRate})$$

Generation is controlled of subsequent digital content for use as part of interaction of the user with the online community based at least in part on the adjusted user competency score (block 1412), such as to assign badges, rankings, recommend content or other users, and so forth. A variety of other examples are also contemplated.

Example System and Device

Figure 15:
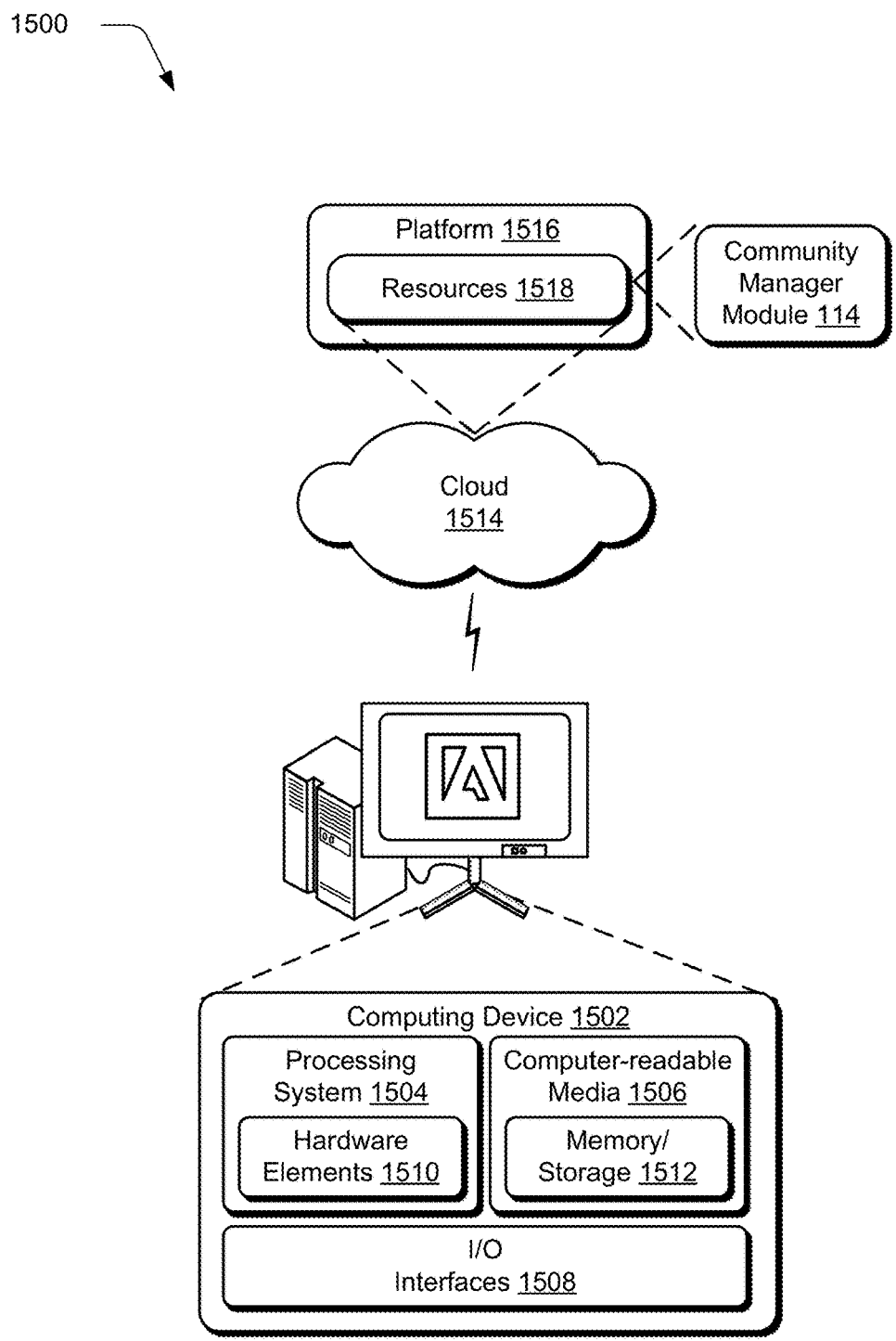
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the community manager module 114 of FIG. 1. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment of an online community, a method implemented by at least one computing device, the method comprising:
   determining, by the at least one computing device, user competency scores defining levels of competency of users in relation to a topic of the online community;
   generating, by the at least one computing device, a gradient by ordering the user competency scores;
   identifying, by the at least one computing device, a change in a slope of the gradient over a threshold amount, the change in the slope of the gradient over the threshold amount indicative of which of the users of the online community are not dormant and which of the users of the online community are dormant;
   controlling, by the at least one computing device, generation of digital content for use as part of interaction in the online community based on user competency scores for the users of the online community that are not dormant; and
   determining a mean user competency score from the user competency scores for the users of the online community that are not dormant for identifying at least one user of the users of the online community that are not dormant as an expert in relation to the topic of the online community.

2. The method as described in claim 1, further comprising removing user competency scores for the users of the online community that are dormant.

3. The method as described in claim 2, further comprising determining an additional mean user competency score from the user competency scores for the users of the online community that are not dormant for identifying at least one user of the users of the online community that are not dormant as a non-expert in relation to the topic of the online community.

4. The method as described in claim 3, wherein the digital content includes a recommendation of other digital content for the at least one user of the users of the online community identified as the non-expert in relation to the topic of the online community.

5. The method as described in claim 1, wherein the digital content includes a recommendation of other digital content for the at least one user of the users of the online community identified as the expert in relation to the topic of the online community.

6. The method as described in claim 1, wherein the digital content includes a badge.

7. The method as described in claim 1, further comprising adjusting the user competency scores based on a dormancy of the users over a period of time.

8. In a digital medium environment of an online community, a system comprising:
   a competency determination module implemented at least partially in hardware of a computing device to determine user competency scores defining levels of competency of users in relation to a topic of the online community;
   a gradient determination module implemented at least partially in the hardware of the computing device to generate a gradient of the user competency scores;
   a slope identification module implemented at least partially in the hardware of the computing device to identify a change in a slope of the gradient over a threshold amount, the change in the slope of the gradient over the threshold amount indicative of which of the users of the online community are not dormant and which of the users of the online community are dormant;
   an interaction control module implemented at least partially in the hardware of the computing device to control generation of digital content for use as part of interaction in the online community based on user competency scores for the users of the online community that are not dormant; and
   the competency determination module further implemented at least partially in the hardware of the computing device to determine a mean user competency score from the user competency scores for the users of the online community that are not dormant for identifying at least one user of the users of the online community that are not dormant as an expert in relation to the topic of the online community.

9. The system as described in claim 8, further comprising a dormant user identification module implemented to remove user competency scores for the users of the online community that are dormant.

10. The system as described in claim 9, wherein the competency determination module is implemented to determine an additional mean user competency score from the user competency scores for the users of the online community that are not dormant for identifying at least one user of the users of the online community that are not dormant as a non-expert in relation to the topic of the online community.

11. The system as described in claim 10, wherein the digital content includes a recommendation of other digital content for the at least one user of the users of the online community identified as the non-expert in relation to the topic of the online community.

12. The system as described in claim 8, wherein the digital content includes a recommendation of other digital content for the at least one user of the users of the online community identified as the expert in relation to the topic of the online community.

13. The system as described in claim 8, wherein the digital content includes badges that are indicative of successive levels of expertise in relation to the topic of the online community.

14. The system as described in claim 8, further comprising a decay factor determination module implemented to compute a decay factor that is usable to adjust the user competency scores.

15. In a digital medium environment of an online community, a system comprising:
   means for determining user competency scores defining levels of competency of users in relation to a topic of the online community;
   means for generating a gradient of the user competency scores;
   means for identifying a change in a slope of the gradient over a threshold amount, the change in the slope of the gradient over the threshold amount indicative of which of the users of the online community are not dormant and which of the users of the online community are dormant;

means for removing user competency scores for the users of the online community that are dormant; and means for determining a mean user competency score from the user competency scores for the users of the online community that are not dormant for identifying at least one user of the users of the online community that are not dormant as an expert in relation to the topic of the online community.

16. The system as described in claim 15, further comprising means for recommending digital content for the at least one user of the users of the online community identified as the expert in relation to the topic of the online community.

17. The system as described in claim 15, further comprising means for determining an additional mean user competency score from the user competency scores for the users of the online community that are not dormant for identifying at least one user of the users of the online community that are not dormant as a non-expert in relation to the topic of the online community.

18. The system as described in claim 17, further comprising means for recommending digital content for the at least one user of the users of the online community identified as the non-expert in relation to the topic of the online community.

19. The system as described in claim 18, wherein the digital content includes badges that are indicative of successive levels of expertise in relation to the topic of the online community.

20. The system as described in claim 15, further comprising means for adjusting the user competency scores based on a dormancy of the users over a period of time.

\* \* \* \* \*